Patented July 7, 1953

2,644,844

UNITED STATES PATENT OFFICE 2,644,844

PROCESS OF PREPARING ALCOHOLS FROM OLEFINS

Richard E. Brooks and Ralph C. Schreyer, Wilmington, Del., assignors to E. I. du Pont de Nemours & Company, Wilmington, Del., a corporation of Delaware No Drawing. Application January 25, 1950, Serial No. 140,556

1 Claim. (Cl. 260—638)

This invention relates to a novel process for the synthesis of alcohols and more particularly to a process for the synthesis of alcohols by simultaneous reaction between carbon monoxide, hydrogen, an olefinic compound and a reagent which directs the reaction to the formation of alcohols and esters thereof.

It was known heretofore that olefinic compounds, such as olefinic hydrocarbons, can be made to react with carbon monoxide and hydrogen at elevated temperatures and pressures to give aldehydes or alcohols having one carbon atom per molecule more than the number of carbon atoms present in a molecule of the olefinic reactant (Roelen, U. S. 2,327,066; Gresham et al., U. S. 2,437,600; Gresham et al., application S. N. 636,263, filed December 20, 1945, now abandoned). This reaction, which is termed "hydrocarbonylation" may be written as follows:

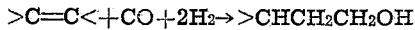

>C=C<+CO+2H₂→ >CHCH₂CH₂OH

While it has been possible to direct the olefin-CO-hydrogen reaction to the formation of aldehydes almost exclusively, thus suppressing the formation of ketones, alcohols and other oxygen-containing organic compounds, as disclosed in the Gresham et al. Patent 2,437,600, it has nevertheless not been possible to direct the reaction exclusively to the formation of alcohols. However, as disclosed in the Gresham et al. application S. N. 4,935, filed January 28, 1948, now U. S. Patent 2,549,455, issued April 17, 1951, the reaction can be directed selectively to the formation of esters, rather than aldehydes, by including an organic carboxylic acid (e. g. acetic acid) in the reaction mixture initially, whereby the reaction takes place as follows:

>C=C<+CO+2H₂+CH₃COOH→
>CHCH₂CH₂OOCCH₃+H₂O

An object of this invention is to provide a novel process for the synthesis of alcohols and esters thereof from reactants comprising olefinic compounds, carbon monoxide, and hydrogen, without the necessity for adding organic carboxylic acids to the mixture. Other objects of the invention will appear hereinafter.

The method of the present invention is to react an olefinic compound with carbon monoxide and hydrogen in the presence of an ester and a hydrocarbonylation catalyst whereby hydrocarbonylation of the olefinic compound, and transesterification of the resulting alcohol with the said ester, take place simultaneously.

The invention is based in part upon the discovery that olefinic compounds react with carbon monoxide and hydrogen in the presence of esters of organic carboxylic acids to give alcohols and esters thereof; the yield of alcohols and esters obtained from the said reactants is considerably higher than the yield of alcohol which would be obtained if the reaction products were obtained from the olefinic compound, carbon monoxide and hydrogen in the absence of the added ester. In other words, the added ester has an unexpected directing effect upon the reaction, suppressing the production of oxo compounds, and resulting in the formation of alcohols and esters thereof as the chief reaction products under conditions which would normally be expected to yield oxo compounds in substantial quantity. In accordance with the present invention, a novel process for the synthesis of alcohols is provided, which novel process comprises reacting carbon monoxide and hyrogen simultaneously with an olefin (e. g. an olefin hydrocarbon) and an ester of a saturated organic carboxylic acid (e. g. an ester of the formula RCOOR', wherein R is a member of the class consisting of hydrogen and alkyl groups having from 1 to 2 carbon atoms and R' is an alkyl group having from 1 to 4 carbon atoms such as methyl, ethyl, propyl, isopropyl, n-butyl, isobutyl, sec.-butyl and tert.-butyl) at a temperature above 250° C. under superatmospheric pressure (suitable pressures being in the range of 325 to 5000 atmospheres) in the presence of a catalytic quantity of a cobalt-containing catalyst dissolved in the reaction mixture, the mol ratio of carbon monoxide : H₂ being initially in the range of 1:3 to 3:1; in this manner a reaction product containing an alcohol of the formula R'OH and an ester of formula RCOOR'' is formed, R'' being the alkyl group of an alkanol of the formula R''OH produced by hydrocarbonylation of the said olefin. In a specific embodiment the resulting mixture is distilled, and an ester of the formula RCOOR' is produced by the ester interchange reaction

RCOOR''+R'OH=RCOOR'+R''OH

The alcohol of the formula R''OH, thus produced, is thereafter separated from the resulting mixture.

Any olefin hydrocarbon, preferably those having at least four carbon atoms per molecule, may be employed in the practice of the invention. Suitable olefinic hydrocarbons include alkyl-substituted ethylenes (such as butene-2, isobutylene, pentene-1, tetramethyl ethylene, diisobutylene, triisobutylene, tetraisobutylene, higher polyisobutylenes containing olefinic unsaturation, cracked gasoline fractions, propylene tetramer, propylene hexamer), cyclohexene, butadiene, isoprene, polymerized dienes, butadiene-xylene polyalkenylation products, mixed olefins or olefin fractions obtainable from cracking and/or dehydrogenation of petroleum, cyclohexadiene, dicyclopentadiene, natural rubber, styrene, alphamethyl styrene, vinyl cyclohexenes, pinene, limonene, and the like. The olefin hydrocarbons preferably contain from 4 to 20, or more, carbon atoms per molecule. The lower molecular weight olefins such as ethylene and propylene may be used, especially when it is desired to separate the hydrocarbonylation product from the reaction mixture in the form of ester rather than alcohol.

The formation of alcohols and esters in accordance with this invention occurs at temperatures above 250° C., but preferably not exceeding 375° C. A suitable range is about 255° to 275° C. At temperatures which are too low for optimum conversion to ester (e. g. temperatures below 250° C.), oxo compounds are produced. It is advantageous to employ relatively high pressures in the practice of the invention, e. g. pressures within the range of about 325 to 5000 atmospheres. At pressures of about 300 atmospheres the reaction gives rise to the formation of mixed products, especially aldehydes, ketones and small amounts of alcohols.

In general, it is desirable to employ pressures considerably above 325 atmospheres, e. g. pressures in excess of about 500 atmospheres. The maximum pressure which may be employed in the practice of the invention is limited only by the strength of the available materials of construction. Pressures in excess of 1500 atmospheres are generally not advantageous, however.

Any cobalt-containing substance may be employed as a catalyst in the practice of the invention. It is generally preferred to employ a catalyst which is dissolved in the reaction mixture (i. e., dissolved in one or more ingredients thereof). Suitable catalysts which are soluble in the reaction mixture include cobalt salts of organic carboxylic acids or inorganic acids, cobalt carbonyls, cobalt carbonyl complexes, cobalt substituted amides, etc. Nickel catalysts, in general, give poor results. The preferred catalysts are cobalt salts of alkanoic acids or cobalt salts of other organic acids, e. g. cobalt naphthenate, cobalt benzoate, and the like. The quantity of catalyst employed in the practice of the invention may be varied rather widely. Olefins which are highly reactive, such as diisobutylene, generally require only extremely minute quantities of catalyst. A convenient quantity of catalyst is in general about 0.01% to 20% by weight based on the total weight of the reaction mixture.

The initial mol ratio of carbon monoxide : $H_2$, for best results, should be within the range of about 1:3 to 3:1. When a very large excess of hydrogen is employed the conversion of the olefin to ester is relatively poor, and loss of the olefinic reactant by hydrogenation becomes excessive. On the other hand, if the mol ratio of carbon monoxide : $H_2$ is high, e. g. about 4:1 or higher, no substantial quantity of ester is obtained, and the reaction gives rise to the formation of other oxygen-containing organic compounds, including at least small quantities of aldehydes.

The formation of alcohol, in one embodiment of the invention, may be represented as follows:

$$CH_2=CHCH_3 + CO + 2H_2 + CH_3COOCH_3 \rightarrow$$
$$C_4H_9OOCCH_3 + CH_3OH$$

$$C_4H_9OOCCH_3 + CH_3OH \rightarrow C_4H_9OH + CH_3COOCH_3$$

The invention is illustrated further by means of the following examples.

*Example 1.*—A mixture consisting of 120 grams of methyl formate, 2 grams of cobaltous acetate, and 156 grams of diisobutylene is heated in a stainless-steel reaction vessel having a capacity of 325 cc. with carbon monoxide and hydrogen (initial mol ratio of CO : $H_2$=1:1) with agitation under a pressure of 700 atmospheres at a maximum temperature of 293° for one hour. Distillation of the resulting product gives 35.9 grams of distillate boiling at 60° to 67° C. at 5 mm. pressure ($N_D^{25}$=1.4230, hydroxyl No. 59.9, acid No. 0.0, ester No. 249.6). This analysis indicated that the mixture contained 77% by weight of highly branched nonyl formate and 15.5% of nonyl alcohol. This fraction, when slowly distilled with added methanol in the presence of an ester interchange catalyst (e. g. an inorganic acid, cobalt salt, or sodium methylate) yields methyl formate and a residue of nonyl alcohol.

*Example 2.*—A mixture consisting of 56 grams tetraisobutylene, 74 grams methyl acetate, and 2 grams cobaltous acetate is heated for 1 hour at about 258° C. with carbon monoxide and hydrogen (mol ratio, 1:1) under 600 to 700 atmospheres' pressure. The product is removed from the reaction vessel and is allowed to stand for two days to permit the cobalt salt to settle. The supernatant liquid is washed four times with an equal volume of distilled water to remove methanol, methyl acetate, and other water-soluble compounds. The remaining organic liquid is distilled, and the following fractions are collected.

1. B. P. 45° to 65° C., wt. 6 grams, $N_D^{25}$=1.4310.
2. B. P. 65° to 95° C., wt. 10 grams, $N_D^{25}$=1.4400.
3. B. P. at 0.37 to 0.4 mm. 97° to 103° C., wt. 11 grams, $N_D^{25}$=1.4501.

There remains a distillation heel which weighs only 0.5 gram. Fraction #3 has the following analysis: Acid No., 0.0; ester No., 144.5 (theory for $C_{17}H_{35}OAc$, 188); hydroxyl No., 44.9 (theory for $C_{17}H_{35}OH$, 219). This analysis indicated that the fraction contained 77% heptadecyl acetate and 20.5% heptadecyl alcohol. This experiment proved that heptadecyl acetate was produced in the synthesis step.

*Example 3.*—A mixture consisting of 54 grams of isobutylene and 108 ml. of a solution of 2 grams of cobalt naphthenate in isobutyl propionate is heated with carbon monoxide and hydrogen (mol ratio 1:1) for 4 hours at 260° C. under 1000 atmospheres' pressure. The resulting product is a mixture of isobutanol, isobutyl propionate, higher alcohol propionates, higher alcohol and other products. Distillation of the resulting mixture without removal of the catalyst yields a low boiling ester fraction and a $C_5$ alcohol fraction.

It is to be understood that the above examples are illustrative only and that numerous methods of practicing the invention will appear to one who is skilled in the art. For example, the process of the invention can be operated either batchwise or continuously. Any suitable method for recycling the recovered ester and/or the unreacted carbon monoxide and hydrogen, or the other ingredients of the reaction mixture which are convertible to esters, may be employed. The catalyst can be produced in situ if desired, e. g. by reaction of a source of cobalt with the organic carboxylic acid.

Any suitable reaction vessel may be employed in the practice of the invention. It is generally preferred to employ a pressure-resistant vessel made of or lined with inert materials such as silver, stainless steel, copper, refractories, or the like. A reaction vessel which has been in contact with a compound of cobalt, in certain instances, becomes sufficiently contaminated with cobalt to permit carrying out the reaction therein without additional quantities of catalyst. Careful investigation has shown however that in the latter embodiment at least minute quantities of cobalt are generally present whenever the reaction takes place at a reasonably rapid rate.

In certain instances, the olefin reactant may undergo conversion or transformation to other olefinic materials under the conditions for the formation of esters in accordance with this invention. For example, at temperatures in excess of about 275°, tetraisobutylene tends to depolymerize and to yield esters of alcohols lower in molecular weight than heptadecyl alcohol. When it is desired to avoid such reactions, it is generally preferable to operate at relatively low temperatures, e. g. at temperatures of about 255° to 275° C.

The present invention does not include the previously known process employing esters, e. g. methyl formate, as mere diluents, at temperatures below 250° C., whereby aldehydes are produced from the olefin-CO-$H_2$ reaction mixture, as disclosed in U. S. Patent 2,437,600, but is directed to the novel reaction involving the ester as a reactant, which reaction takes place at temperatures above 250° C.

The alcohols obtained in the practice of this invention are highly valuable and useful in the manufacture of plasticizers, detergents, etc.

Since many different embodiments of the invention may be made without departing from the spirit and scope thereof, it is to be understood that we do not limit ourselves except as set forth in the following claim.

We claim:

A process for the synthesis of a branched chain primary heptadecyl alcohol which comprises reacting carbon monoxide and hydrogen simultaneously with tetraisobutylene and methyl acetate at a temperature of 255° to 275° C., in the presence of a catalytic quantity of cobalt acetate dissolved in the reaction mixture, under a pressure within the range of from 325 to 1500 atmospheres, the mol ratio of carbon monoxide : $H_2$ being initially in the range of about 1:3 to 3:1, whereby a mixture containing methanol and an acetic acid ester of branched chain primary heptadecyl alcohol is obtained, and thereafter recovering the said heptadecanol by methanolysis of the said ester.

RICHARD E. BROOKS.
RALPH C. SCHREYER.

References Cited in the file of this patent

UNITED STATES PATENTS

| Number | Name | Date |
| --- | --- | --- |
| 1,433,308 | Steffens | Oct. 24, 1922 |
| 1,770,414 | Martin et al. | July 15, 1930 |
| 2,327,066 | Roelen | Aug. 17, 1943 |
| 2,437,600 | Gresham et al. | Mar. 9, 1948 |
| 2,448,368 | Gresham et al. | Aug. 31, 1948 |
| 2,476,052 | Lippincott | July 12, 1949 |
| 2,564,130 | Schreyer | Aug. 14, 1951 |